Oct. 16, 1951 M. D. HOPKINS ET AL 2,571,576
ROTARY DISK HOPPER FEED FOR CYLINDRICAL ARTICLES
Filed Aug. 3, 1948 2 SHEETS—SHEET 2
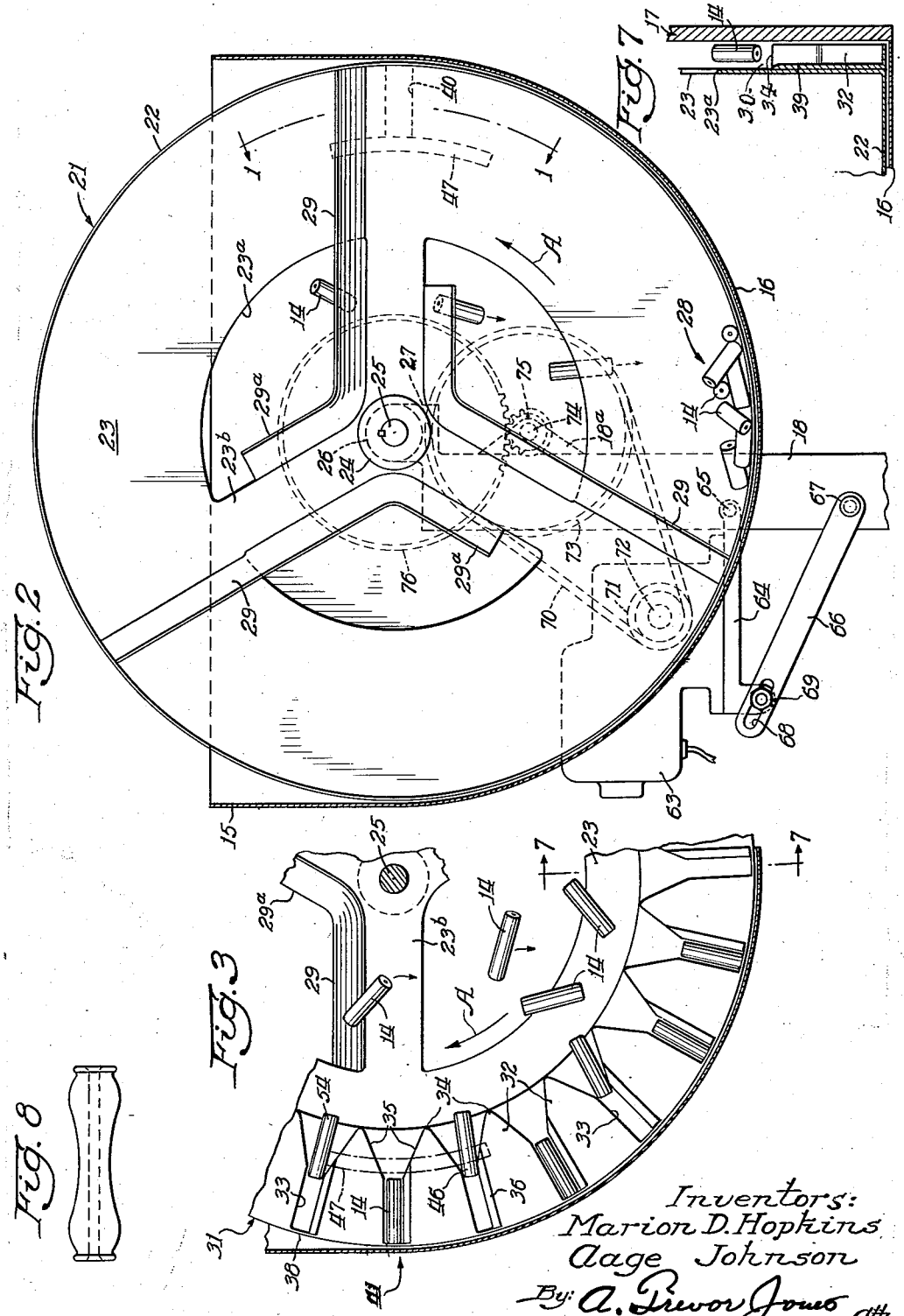
Inventors:
Marion D. Hopkins
Aage Johnson
By: A. Trevor Jones Atty.

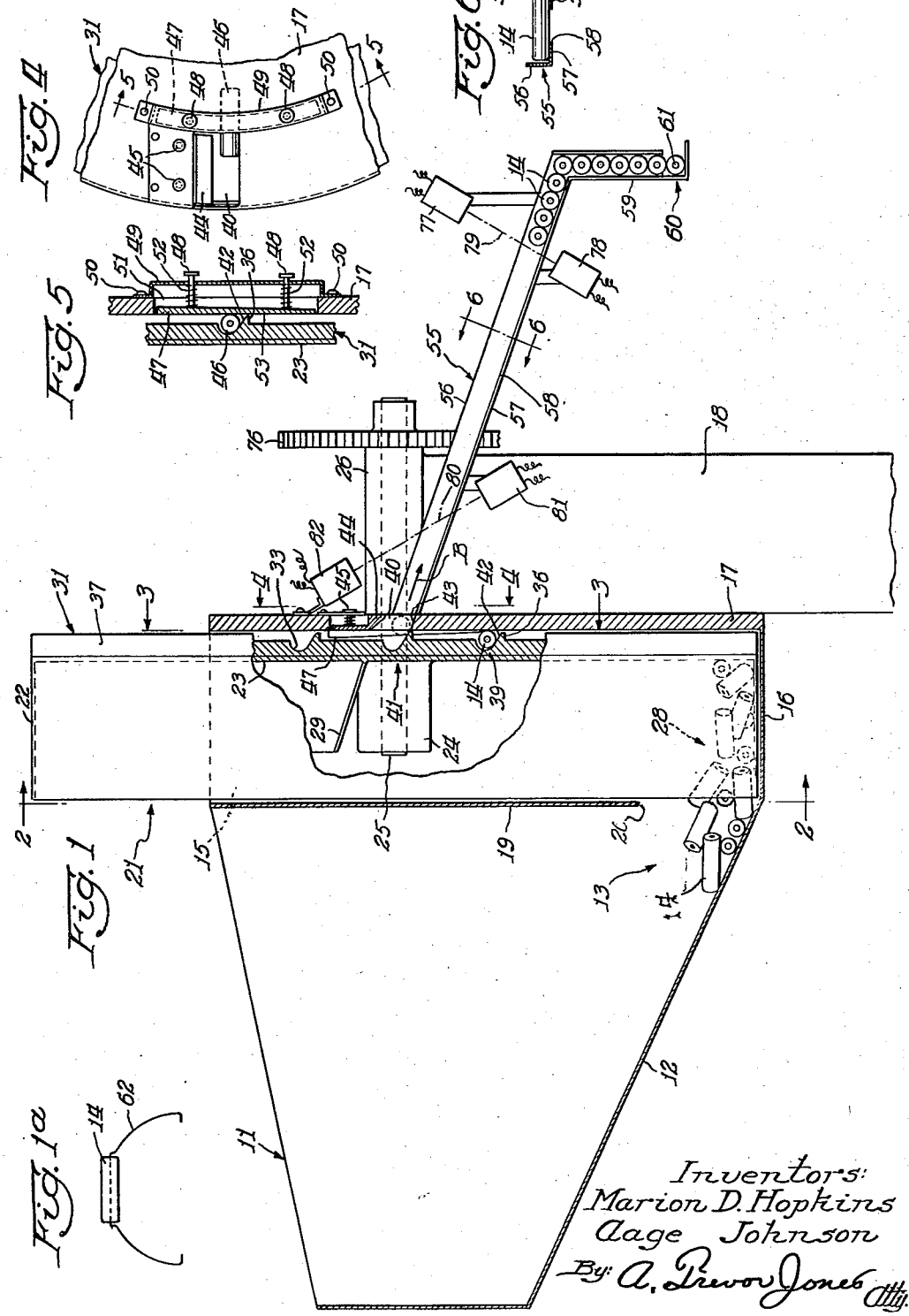

Patented Oct. 16, 1951

2,571,576

UNITED STATES PATENT OFFICE 2,571,576

ROTARY DISK HOPPER FEED FOR CYLINDRICAL ARTICLES

Marion D. Hopkins, River Forest, and Aage Johnson, Elmwood Park, Ill., assignors to Hopkins Machine Corporation, a corporation of Illinois Application August 3, 1948, Serial No. 42,224

10 Claims. (Cl. 10—169)

This invention relates to feed apparatus for elongated cylindrical articles, more particularly light objects such as relatively small wood cylinders, and it is illustrated in this instance for the feeding of wood handles which are fed into bail-making machines for automatic assembly with a wire section to form a bail wherein the handle has an axial bore through which the wire is passed before being formed to bail shape and the wood piece thereafter serving as a handle or grip member for the bail, the latter being suitable for attaching to heavy cans, pails, or packages, for example, to facilitate their being carried by hand.

In some instances, such a handle piece may be in its simplest form a plain wood cylinder or in other cases may be exteriorly shaped for ornamentation or for conformation to the hand of the user. In the latter instance the apparatus is adaptable for feeding the wood pieces to a machine for turning the handles for forming purposes preliminary to being later fed to a wire bail forming machine or other assembly devices.

The invention aims to provide an improved feed apparatus of this class in which a large quantity of the articles may be placed in unarranged relationship, that is as being poured out of a box or barrel, for example, in which the articles lie every way with their axes extending in many different planes, the apparatus comprising continuously operating mechanism for arranging the articles and delivering them successively aligned with the axes of the articles parallel so that they may be successively acted upon by other apparatus for forming or assembly purposes.

More specifically, the improved apparatus comprises a hopper for receiving an unarranged quantity of said articles, continuously operated mechanism for receiving the articles by gravity from said hopper including pocket means for continuously arranging the articles with their axes in a common plane, and delivery means for continuously receiving the articles successively from said pocket means aligned with the axes of the articles parallel.

In an important aspect, the invention contemplates a novel rotary feed element for this purpose incorporated in the improved apparatus, contributing to enhanced simplicity, ease of operation, and efficiency of delivery of the articles as described.

In another aspect, the invention desirably includes automatic devices for starting and stopping the apparatus as the supply of the articles adjacent the station for treatment thereof diminishes or increases, so that the apparatus may run intermittently as required, thus saving motive power and minimizing wear.

A further object of the invention is the provision of expedients for guarding against jamming or clogging of the apparatus by occasional articles which may be improperly disposed in the feeding and delivery cycle and which are temporarily held in undelivered position to be returned to an earlier stage in the cycle for re-circuiting.

These and other objects and advantages will be apparent from the following description, taken together with the accompanying drawings, of an illustrative embodiment of the invention, and in which drawings—

Figure 1a is a view of an illustrative bail with wood handle;

Figure 1 is a side elevational view of apparatus embodying the present invention, parts being shown in section somewhat on the arcuate line 1—1 of Fig. 2, but omitting some of the driving elements;

Figure 2 is a cross-section taken on the line 2—2 of Fig. 1, but showing also a motor drive for the apparatus;

Figure 3 is a partial cross-section taken on the line 3—3 of Fig. 1 looking in the opposite direction from Fig. 2 and showing a sector of the rotary element;

Figure 4 is a face view of a segment of the apparatus adjacent the delivery position of the articles, looking in the same direction as Fig. 3, and showing one of the guard expedients, and and being taken on the line 4—4 of Fig. 1.

Figure 5 is an arcuate section taken on the line 5—5 of Fig. 4;

Figure 6 is a cross-section of the delivery chute taken on the line 6—6 of Fig. 1;

Figure 7 is a partial section taken on the line 7—7 of Fig. 3, showing a common pocket for arranging handles initially in a common plane but with their axes extending in different directions, and one of the individual pockets for arranging handles in a common plane and with their axes all extending radially;

Figure 8 is a view, somewhat enlarged, of a wood handle having a turned contour.

Referring in detail to the illustrative construction shown in the drawings, the numeral 11 indicates means for receiving an unarranged quantity of the articles or handles to be fed and being here shown in the form of a hopper which may have an inclined floor 12, the top of the hopper being open to permit dumping thereinto, as from a barrel or box, a considerable quantity of the handles, a few of these being indicated somewhat diagrammatically at the bottom of the hopper, as at 13. An individual handle is here given the numeral 14. The hopper 11 at its forward end has a trough-like portion 15 which has a concavo-convex lower wall 16 that is secured as by welding to a vertical hopper end wall or platen 17, the latter in turn being suitably secured to a pedestal 18. The pedestal is shown broken away at its lower end to conserve space but it will be understood that it may be suitable for supporting the apparatus on a factory floor or the like adjacent to a wire forming and bail assembly apparatus (not shown).

Between the rear portion of hopper 11 and its trough-like portion 15, in accordance with this present invention, there is shown a partition wall 19 to hold the mass of handles 14 in the hopper away from the trough-like portion 15 thereof but to permit lower ones of the handles, as at 13, to slide down the incline 12 by gravity into the lower part of the trough-like portion 15 of the hopper, the partition 19 being discontinued at its lower end to provide the opening 20 thereunder for this purpose.

Revolving in the trough-like portion 15 of the hopper is a rotor indicated generally by the numeral 21, of somewhat barrel shape, having a cylindrical wall 22 which has a close but rotating fit in the concavo-convex wall 16 of the hopper trough 15. The rotor cylindrical wall 22 is secured to the rotor disc 23 which has a central opening 23a spanned by a plurality, as here three, integral rotor spokes 23b. The rotor spokes 23b are secured to a rotor hub 24 that rotates on an axle 25 that is journaled in a bearing 26 carried on a bracket 27 at the upper end of the pedestal 18, so that the rotor 21 may rotate freely in the trough 15, in this instance in the direction of the arrow A.

At any rotative position of the rotor, handles 14 dropping by gravity down the inclined floor as at 13 may fall through the opening 20 under the partition 19 and into the barrel-like interior of the rotor as at 28, the end of the rotor adjacent the partition 19 being open for this purpose, while the opposite end of the rotor is partially closed, i. e., near the periphery of the rotor, by the disc 23 which turns with the rotor. As the rotor rotates, handles 14 will roll by gravity as at 28 in the lower sector of the rotor in the vicinity of the hopper concavo-convex wall 16.

Each of the rotor spokes 23b carries a pick-up blade or arm 29 on the advance edge of the spoke, each blade having an angular portion 29a which extends across the juncture between two adjacent spokes and for a portion of the distance from the axis of said adjacent spoke on the trailing side of the latter. The blades 29 are advantageously inclined transversely toward the central opening 23a in the rotor disc so that as the rotor revolves in the direction of the arrow A, handles 14 are picked up from the mass 28 thereof and are carried upwardly on the blade through a sector of the apparatus constituting the lower right-hand sector looking at the apparatus in the direction of Fig. 2, or the lower left-hand sector looking in the direction of Fig. 3. When a blade 29 with a handle or handles 14 thereon reaches the upper limits of this quarter sector, or, in other words to a horizontal position as shown in Figs. 2 and 3, the handle on the blade slides off the blade and falls through the central opening 23a in the rotor disc into a space 30 (Fig. 7) between the disc 23 and the platen 17, which space provides pocket means for arranging the handles with their axes in a common plane, since this space is just slightly wider than the diameter of the handle. While the handles are thus disposed with their axes in a common plane, their axes may extend in many different directions in this common plane. The angular extension 29a of the blade insures that if a handle is slow in falling off the blade while the blade continues to move upwardly and tends to fall toward the axis of the rotor it will still be diverted through the opening 23a into the space 30 by the blade extension 29a.

Further in accordance with the present invention, carried on the face of the disc 23, to rotate therewith, between the disc and the platen 17 and forming an annulus about the space 30 is a pocket carrying ring 31 which is of internally serrated formation having on its inner periphery (which is otherwise continuously annular) an annular series of uniformly spaced apart divider blocks 32 circumferentially spaced apart at their ends adjacent the periphery of the ring 31 a distance just slightly greater than a handle diameter and thus forming a series of individual pockets 33 for the handles in the plane of the space 30, in which the handles are received from the common space 30 by the action of gravity, these individual pockets being disposed so that the handles are received therein with the axes of the handles extending radially of the rotor. Movement of the handles centrifugally is limited by the continuously annular character of the ring 31 across the pockets 33 at their ends farthest from the rotor axis. Each divider block 32 is pointed or peaked centrally as at 34 so as to provide a pair of inclined surfaces 35 adjacent each pocket 33 constituting a flared mouth for each pocket facing in the direction of the space 30 so as to facilitate entry of a handle from among the handles in the space 30 into a pocket 33. The peaks 34 further serve as fulcrums about which the handles are tilted under the influence of gravity and centrifugal force to cause successive handles to be rotated on a transverse axis to direct them into a position radial of the rotor, if they are not already in such position, to facilitate entry of a handle head on into an individual pocket.

As best seen in Figs. 1 and 5, the individual pockets 33 for the handles 14 have a laterally extending lip 36 on their trailing edge which extends into close but sliding juxtaposition adjacent the platen 17. Since the ring 31 is continuous not only about its periphery but also on its face adjacent the rotor disc 23, the pockets 33 are closed not only at their ends farthest from the rotor axis, as at 38, but also laterally at their sides adjacent the rotor disc 23 as at 39. This construction permits the ring 31 to be cast, for example, in one piece. So constructed, the pockets 33 are always open only at their ends nearest the rotor axis adjacent the flaring mouth provided for each pocket by the inclined surfaces 35 of the divider blocks 32. As best seen in Figure 1, the perimeter 37 of the ring 31 extends more closely into sliding juxtaposition with the platen 17 than the body of the ring to further insure closure of the pockets 33 at their ends farthest from the axis.

At their sides opposite the rotor disc 23, the pockets 33 are normally closed throughout the greater circumference of the ring 31, and particularly throughout more than half of its lower arc of movement, by the platen 17 which it will be understood is stationary, the ring 31, which is fixed to the rotor 21, rotating in face to face juxtaposition with the platen 17. The platen is, however, slotted at a predetermined location therein, and in this instance at just one place, as at 40, to provide a discharge point or opening for the handles successively. That is to say, as the rotor and ring rotate in the direction of the arrow A, having picked up handles for the space 30 and some of these having fallen into pockets 33, and a pocket comes into a position in which it is horizontal as at 41, the pocket in this position is now open laterally through the slot in the platen. To facilitate this the pockets on their trailing edges are cut away as at 42 so as to slope downwardly thereat and this slope is continued into the lip 36 to provide a rolling incline for the cylindrical handle which incline is further continued in the platen 17 by sloping the lower edge of the slot 40 downwardly toward the outer face of the platen as at 43 so that a handle in a pocket at this position in the cycle of rotation, that is when it comes opposite the slot 40, will roll out of the pocket and through the slot in the platen in the direction of the arrow B.

Should it happen that there is a handle in the slot 40 not yet passed therethrough at a time when another handle comes successively into register with the slot 40 to normally roll therethrough (such a contingency, however, being highly unlikely as later pointed out), the upper edge of the slot 40 is formed in a movable plate 44 which is held yieldingly in position by spring pressed studs 45 carried by the platen, so that this plate will yield and permit a handle which has not yet passed through the slot 40 to move upwardly and laterally outwardly of the slot under the influence of a handle in a pocket 14 passing thereby, to permit the two handles to pass by each other and prevent jamming of the apparatus.

Somewhat similarly, should a handle in a pocket 33 coming to the position 41 opposite the slot 40 be incompletely entered into the pocket for example as at 46, Figs. 3, 4 and 5, means are provided for insuring that such an incompletely pocketed handle shall not fall out through slot 40 in such a way that it might fall, for example, head on instead of laterally. Such means are here shown as an arcuate grip strip 47 which is carried by the platen 17 to register with an arc concentric with but just slightly nearer the axis of the rotor than the adjacent ends of the pockets 33. The grip strip 47 is yieldingly carried by a pair of studs 48 fixed to the strip and passing through a cover strip 49 which is screwed to the outer face of the platen 17 at its upper and lower end as at 50. This cover strip covers the arcuate cut-out 51 in the platen occupied by the grip strip 47 and in which the latter has play as permitted by the studs 48, the heads of which are on the outer side of the cover strip 49. The grip strip 47 is normally urged toward the ring 31 by compression coil springs 52 on the studs 48, and the grip strip is shown tapered in cross-section to be thicker at its upper end than at its lower end, thus having in the nature of a cam surface 53 on its face adjacent the pockets 33. So constructed and arranged, a handle as at 46 (Fig. 3) which is not completely entered into a pocket will ride onto the surface 53 of the grip strip and in the upward movement of the rotor at this time will (Fig. 5) slide along this surface 53 pressing the grip strip progressively by reason of the taper of the latter and thus causing the grip strip to hold the handle 14 that is incompletely pocketed until such handle has passed by the discharge slot 40 and prevent its dropping therethrough. When such incompletely pocketed handle has passed by the slot 40, and has also passed beyond the arc of influence of the grip strip as at 54 (Fig. 3), it may fall back out of the pocket, under the influence of gravity, and return to the common space 30 where it may have another chance to drop into an individual pocket 33 and this next time be correctly pocketed so as to be free of the influence of the grip strip 47 and to fall out properly through the discharge opening 40 upon coming into register therewith. It will be understood that handles which are even less completely entered into a pocket 33 than the handle just described, will simply drop back likewise into the space 30 to have another chance to enter a pocket, it being unnecessary that every pocket be filled with a handle.

Reverting to the handles which are correctly pocketed and which successively and successfully drop out through the discharge slot 40, these, following the present invention, will roll down, in the direction of the arrow B, in a delivery chute 55, which, as shown in Fig. 6, is desirably in the form of a pair of angle bars 56 having their lower flanges 57 directed toward each other to provide a support for the handles 14 moving therein but leaving a longitudinal opening 58 along a center line of the chute. By reason of the mechanism and operation previously described, it will be understood that the handles 14, which were deposited in the hopper 11 in a somewhat conglomerate mass extending in different directions and in different planes, now come down the delivery chute 55 aligned with their ends aligned, with their axes parallel and, in this instance, in a common plane, that is the plane of the chute 55. At its lower end, the chute 55 may be turned in a vertically downward extension as at 59 to insure a vertical stack of handles, the lowermost one of which, by the action of gravity and the weight of the handles thereabove, is brought to a location such as a station 60 where a predetermined operation may be performed on the handle by apparatus or mechanism not here shown and which does not necessarily form a part of the present invention, but which as already referred to may include means for passing a wire section through the bore 61 of the handle and later by mechanism also not shown, cutting off the wire section, if necessary and forming it to bail form as at 62 (Fig. 1a).

Suitable driving power is provided for the rotor 21 represented in this instance by a motor reducer device 63 which may be carried on a platform 64 pivoted as at 65 on the pedestal 18. The platform 64 is adjustably supported at its other end by a pair of links 66 articulated at one end as at 67 with the pedestal 18 and at their other end with the platform 64 as by a slot 68 and adjustment nut 69. Thus variations in the platform 64 may be effected whereby a drive belt 70 may be tightened or loosened as required. The drive belt 70 is here shown entrained with a pulley 71 on the output shaft 72 of the motor reducer and with a larger pulley 73 on a stub shaft 74 rotatable in a bracket 18a on the pedestal 18. The stub shaft 74 may carry a pinion 75 which meshes with a gear 76 pinned on the rotor axle 25. By reason of such drive and gearing the rotor is caused to turn relatively slowly.

Since it may well happen that the apparatus just described will feed handles to the working station 60 faster than the work can be performed on the handle at this station, automatic means are here provided, further following the present invention, for starting and stopping the apparatus conformable to handle feed requirements. For this purpose an electric eye mechanism may be provided, and as here shown preferably a plurality of such devices. One such device may comprise a pair of elements 77 and 78 one of which may constitute a light source and the other a light responsive receiver for a ray of light 79 emitted from the light source. The elements 77 and 78 are arranged one above and one below the chute 55, adjacent the lower end of the chute so that the ray 79 normally passes through the longitudinal opening 58 in the chute. If there are no handles in the chute at this point to obstruct the passage of the ray 79 from the light source to the light receiver, this electric eye mechanism will be activated to actuate a relay in circuit with the motor reducer 63 to cause the motor to start, the rotor to rotate, and the apparatus to feed handles through the discharge slot 40 and into the delivery chute 55. The operation will continue until the vertical extension 59 and the chute 55 itself are filled with handles. When the chute 55 is filled with handles to a point adjacent the discharge slot 40 the handles will interrupt another light ray 80 of another electric eye mechanism comprising the elements 81 and 82 one of which constitutes a light emitter and the other a light responsive receiver. The ray 80 normally passes through the slot 58 from the emitter to receiver unless and until interrupted by handles in the chute. When the chute is filled to interrupt both the ray 79 and the ray 80, relay mechanism is actuated also in circuit with the motor 63, to break the motor circuit and stop the rotation of the rotor and delivery of handles to the chute.

So as to prevent short runs of the apparatus the motor will remain stopped until the handles are used up from the chute to again permit both the ray 79 and the ray 80 to pass through the opening 58 to activate the devices 77—78 and 81—82 and again actuate relays which will start the motor. Conversely, the motor will not stop until both the rays 79 and 80 are interrupted. Since the relay mechanisms desirably have a slightly delayed action, momentary interruption of the rays by a handle rolling down the chute will not affect the motor.

Operation of the apparatus will be apparent from the foregoing description, it being sufficient to summarize at this point that handles may be dumped into the hopper at any time in an unarranged mass. The motor is put potentially in circuit by a master switch (not shown) and the apparatus then operates intermittently (but avoiding too frequent starts and stops as explained) to keep handles fed to the delivery chute, the rotor revolving when required for this purpose. The handles are fed to the rotor from the hopper by gravity, being lifted by the pick-up blades to be dropped into the common pocket space where they are disposed in a single plane, albeit with their axes in different directions in that common plane, dropping as the rotor rotates, into the individual pockets where the handles are still in the common single plane, but now arranged with their axes uniformly disposed, and in this instance radial of the rotor, the handles being again lifted by rotation of the rotor and dropped out of the individual pockets laterally as each pocket comes into register with the discharge slot extending horizontally.

The invention is not intended to be limited to details of construction shown for purposes of illustration, and furthermore, it is to be understood that it is not essential that all features of the invention be at all times used conjointly since various combinations or sub-combinations may at times be advantageously employed, and such changes may be made as fall within the scope of the following claims without departing from the invention.

The invention having been described, what is here claimed is:

1. Feed apparatus for elongated cylindrical articles comprising, in combination, a hopper for receiving an unarranged quantity of said articles, rotary mechanism embodying a plurality of pick-up blades on one side of said rotary mechanism for receiving the articles by gravity from said hopper, pocket means on the opposite side of said rotary mechanism including common pocket means adjacent the center of said rotary mechanism for arranging the articles preliminarily with their axes in a common plane, individual pocket means associated with the said mechanism for receiving the articles individually by gravity while in said plane, said individual pocket means being arranged about the periphery of said rotary mechanism and disposing the articles with their axes radially of said mechanism in said common plane, a central opening in the rotary mechanism for the passage of articles from the said blades by gravity into said common pocket, and means for delivering the articles successively laterally from said individual pockets at a predetermined point in the rotation of the mechanism, aligned with the axes of the articles parallel.

2. Feed apparatus for elongated cylindrical articles embodying a hopper, a rotor open to said hopper on one side, a plurality of pick-up blades in said rotor, a rotor disc, a central opening in said disc extending between each pair of blades, said blades being transversely inclined toward an adjacent opening in the direction of rotation, a stationary platen on the opposite side of said rotor spaced from said disc by approximately the diameter of one of said articles, an annulus carried by said disc between it and said platen adjacent the periphery of the disc and having face-to-face rotative juxtaposition with said platen, individual radially disposed pockets in said annulus for receiving articles from the common space between said disc and platen, a slot in the stationary platen substantially in register with a horizontal radius of the rotor for receiving the articles by gravity therethrough as the individual pockets come into register with said slot, and a delivery chute receiving the articles from said slot.

3. Feed apparatus for elongated cylindrical articles embodying a hopper, a rotor open to said hopper on one side, a plurality of pick-up blades in said rotor, a rotor disc, a central opening in said disc extending between each pair of blades, said blades being transversely inclined toward an adjacent opening in the direction of rotation, a stationary platen on the opposite side of said rotor spaced from said disc by approximately the diameter of said article, an annulus carried by said disc between it and said platen adjacent the periphery of the disc and having face-to-face rotative juxtaposition with said platen, individual radially disposed pockets in said annulus for receiving articles from the common space between said disc and platen, and a slot in the stationary platen substantially in register with a horizontal radius of the rotor, one edge of said slot being provided by a resilient plate to guard against jamming of the apparatus.

4. Feed apparatus for elongated cylindrical articles embodying a hopper, a rotor open to said hopper on one side, a plurality of pick-up blades in said rotor, a rotor disc, a central opening in said disc extending between each pair of blades, said blades being transversely inclined toward an adjacent opening in the direction of rotation, a stationary platen on the opposite side of said rotor spaced from said disc by approximately the diameter of said article, an annulus carried by said disc between it and said platen adjacent the periphery of the disc and having face-to-face rotative juxtaposition with said platen, individual radially disposed pockets in said annulus for receiving articles from the common space between said disc and platen, and a slot in the stationary platen substantially in register with a horizontal radius of the rotor, said individual pockets having flaring mouths and peaks between a pair thereof to facilitate entry of an article thereinto.

5. Feed apparatus for elongated cylindrical articles embodying a hopper, a rotor open to said hopper on one side, a plurality of pick-up blades in said rotor, a rotor disc, a central opening in said disc extending between each pair of blades, said blades being transversely inclined toward an adjacent opening in the direction of rotation, a stationary platen on the opposite side of said rotor spaced from said disc by approximately the diameter of said article, an annulus carried by said disc between it and said platen adjacent the periphery of the disc and having face-to-face rotative juxtaposition with said platen, individual radially disposed pockets in said annulus for receiving articles from the common space between said disc and platen, and a slot in the stationary platen substantially in register with a horizontal radius of the rotor, said individual pockets having flaring mouths to facilitate entry of an article thereinto and being sloped laterally toward said slot.

6. Feed apparatus for elongated cylindrical articles embodying a hopper, a rotor open to said hopper on one side, a plurality of pick-up blades in said rotor, a rotor disc, a central opening in said disc extending between each pair of blades, said blades being transversely inclined toward an adjacent opening in the direction of rotation, a stationary platen on the opposite side of said rotor spaced from said disc by approximately the diameter of said article, an annulus carried by said disc between it and said platen adjacent the periphery of the disc and having face-to-face rotative juxtaposition with said platen, individual radially disposed pockets in said annulus for receiving articles from the common space between said disc and platen, a slot in the stationary platen substantially in register with a horizontal radius of the rotor, and a resilient grip bar having a cam surface for engaging a said article incompletely entered in a said pocket to guard against jamming in said slot.

7. Feed apparatus for elongated cylindrical articles embodying a hopper, a rotor having a cylindrical barrel open to said hopper on one side, spokes on the barrel joining it with a central hub for the rotor, a plurality of pick-up blades one on the leading edge of each spoke, a rotor disc, a central opening in said disc extending between each pair of spokes, said blades being transversely inclined toward an adjacent opening in the direction of rotation, a stationary platen on the opposite side of said rotor spaced from said disc by approximately the diameter of said article, an annulus carried by said disc between it and said platen adjacent the periphery of the disc and having face-to-face rotative juxtaposition with said platen, individual radially disposed pockets in said annulus for receiving articles from the common space between said disc and platen, and a slot in the stationary platen substantially in register with a horizontal radius of the rotor, each blade having an angular extension on the trailing edge of an adjacent spoke.

8. Feed apparatus for elongated cylindrical articles, comprising, in combination, a hopper for receiving an unarranged quantity of said articles, said hopper having an end wall, rotary mechanism in said hopper for picking up the articles from said hopper, said mechanism including a rotating disc having a central opening, a radial pick-up arm on the face of said disc, said disc being between said arm and said end wall, a receptacle formed by said disc and said end wall for receiving the articles from said pick-up arm through said central opening and arranging them with their longitudinal axes extending in a common plane, said receptacle being restricted in axial dimension to receive said articles in only one common radial plane, and radially disposed pockets rotatable with said disc for receiving the articles from said receptacle and arranging the articles with their longitudinal axes extending radially in said common plane.

9. Feed apparatus for elongated cylindrical articles, comprising, in combination, a hopper for receiving an unarranged quantity of said articles, said hopper having an end wall, rotary mechanism in said hopper for picking up the articles from said hopper, said mechanism including a rotating disc having a central opening, a radial pick-up arm on the face of said disc, said disc being between said arm and said end wall, a receptacle formed by said disc and said end wall for receiving the articles from said pick-up arm through said central opening and arranging them with their longitudinal axes extending in a common plane, said receptacle being restricted in axial dimension to receive said articles in only one common radial plane, radially disposed pockets rotatable with said disc for receiving the articles from said receptacle and arranging the articles with their longitudinal axes extending radially in said common plane, and a chute having its upper end adjacent the path of said pockets and the upper margin of said end wall for receiving articles by gravity from said pockets.

10. Feed apparatus for elongated cylindrical articles comprising, in combination, a hopper for receiving an unarranged quantity of said articles, said hopper having a stationary end wall, rotary mechanism in said hopper for picking up the articles from said hopper, said mechanism including a rotating disc having a central opening, radial pick-up arms on the face of said disc, said disc being both between said arms and said end wall, a receptacle formed by and between said disc and said end wall for receiving the articles by gravity from said pick-up arms through said central opening and arranging them with their longitudinal axes extending in a common plane, said receptacle being restricted in axial dimension to receive said articles in only one common radial plane, peripherally disposed radially extending semi-cylindrical pockets rotatable with said disc for receiving the articles by gravity from said receptacle and arranging the articles with their longitudinal axes extending radially in said common plane, said pockets being normally closed by said end wall, a slot in said end wall substantially in register with a horizontal radius of the disc for receiving the articles therethrough by gravity from said pockets, and a chute receiving the articles from said slot, said chute being of a width to receive the articles side by side in a row.

MARION D. HOPKINS.
AAGE JOHNSON.

REFERENCES CITED

The following references are of record in the file of this patent:

UNITED STATES PATENTS

| Number | Name | Date |
|---|---|---|
| 841,471 | Vallentine | Jan. 15, 1907 |
| 1,031,589 | Russell | July 2, 1912 |
| 1,340,432 | Benjamin | May 18, 1920 |
| 1,985,563 | Fitzgerald | Dec. 25, 1934 |
| 2,060,182 | Dellaree | Nov. 10, 1936 |
| 2,088,117 | Rehnberg | July 27, 1937 |
| 2,158,069 | Grover | May 16, 1939 |
| 2,228,780 | Roberts | Jan. 14, 1941 |
| 2,433,560 | Hurley | Dec. 30, 1947 |
| 2,546,866 | Overly | Mar. 27, 1951 |